United States Patent [19]

Cook

[11] 4,245,228

[45] Jan. 13, 1981

[54] LASER PLOTTER

[75] Inventor: George F. Cook, Houston, Tex.

[73] Assignee: Sequential Data Machines, Inc., Houston, Tex.

[21] Appl. No.: 875,431

[22] Filed: Feb. 6, 1978

[51] Int. Cl.³ ............................................. G01D 9/42
[52] U.S. Cl. ................................... 346/108; 346/1.1
[58] Field of Search ................................... 346/108, 1

[56] References Cited

U.S. PATENT DOCUMENTS

| 3,657,473 | 4/1972 | Corcoran | 346/108 UX |
| 3,798,365 | 3/1974 | Browning et al. | 346/140 X |
| 3,943,529 | 3/1976 | Feldman et al. | 346/108 |
| 4,000,493 | 12/1976 | Spaulding et al. | 346/108 X |
| 4,044,363 | 8/1977 | Morgan | 346/108 X |
| 4,089,008 | 5/1978 | Suga et al. | 346/108 X |

Primary Examiner—George H. Miller, Jr.
Attorney, Agent, or Firm—Browning, Bushman & Zamecki

[57] ABSTRACT

Disclosed is a plotter for recording information on a light sensitive medium by modulating a laser beam incident on the medium. Data is processed into digital light modulation signals, and corresponding control signals deflect the modulated light beam to scan the medium transversely while sweeping a high resolution raster perpendicular to the scan direction. In a method disclosed, data is processed in a preselected raster format. Instructions and parameters are determined for modulating a laser light beam according to the data thus presented, and deflecting the modulated light beam to intersect a recording medium. All raster combinations possible in the selected data format are constructed and stored in advance of data presentation, as is the appropriate time scan control information. Information is then recorded on the medium in transverse scans, each scan being structured of a relatively large number of lateral raster lines composed of dots whose intensities correspond to the original data.

60 Claims, 12 Drawing Figures fig.1 fig.5 fig.6 fig.7 fig.8 fig.9 fig.10 fig.11

LASER PLOTTER

BACKGROUND OF THE INVENTION

1. Field of the Invention

The present invention pertains to methods and apparatus for displaying and/or recording data signals. More particularly, the present invention is related to techniques for high speed information recording, such as by way of modulated laser light. Such recorders, or plotters, find particular application in the field of seismic data analysis and presentation. Seismic information is often acquired in the form of large volumes of time sequential traces requiring sophisticated processing and presentation before analysis is practical.

2. Description of Prior Art

Photographic reproduction plotters are known for use in displaying both high contrast images as well as continuous tone gray scale or variable intensity images, particularly where the plotting system is required to generate image data derived from input data or signals at a very high rate. In the area of digital plotters, it is customary to generate images in dot raster form whereby a dot is represented by a logical one (1), a no-dot is represented by logical zero (0), and the images are comprised of large arrays of ones and zeroes. Images resolution is determined by the number of dots per unit area. As the image resolution is increased, the amount of time required to process the data by computer, as well as the amount of computer memory required to hold the image information increases exponentially.

In such prior art photographic plotters, pure dot raster scans are utilized wherein the recording light beam is caused to sweep across the recording medium in a single line. During such a scan, the intensity of the light beam is varied to print information points by exposing the recording medium to appropriate light intensity levels. When such a scan is completed, the plotter is repositioned to carry out the next adjacent scan. Each scan is effectively one dot wide. However, by combining a great number of such scans, a photographic record of information in the form of an exposed area of recording medium is constructed. Such plotters require that the data to be recorded be broken down and processed according to the individual scan lines that can be effected by the plotter. Thus, for example, where the information to be recorded is in the form of a curve, or trace, that requires a two-dimensional presentation, a great number of successive scans may be required to plot the information. The information for each individual scan must be provided to the plotter independently of the information provided for the other scans. Furthermore, where additional data is provided for plotting in the form of traces, or data curves, which may overlap the original curve plotted, all such overlaping traces must be processed and broken down into individual scan information signals before any of the traces may be plotted. Thus, a large data storage and processing facility may be required for the operation of such a prior art plotter.

The use of lasers in high speed plotters for recording information on light-sensitive media is known. U.S. Pat. No. 3,958,250 discloses an example of such a photographic plotting system. There, a modulated laser beam is caused to repeatedly scan a photographic film while a deflector is periodically advanced to move the position of the laser scan along the film. Another example of a laser beam plotter is shown in U.S. Pat. No. 4,028,732.

In view of the large volumes of data often required to be processed and recorded, a plotter capable of handling such data must be able to record the processed information at a rapid rate. The processing of the data should be carried on independently of the operation of the recording mechanism to the extent that neither activity interferes, or delays, the completion of the other. Furthermore, the plotter should feature high resolution to allow the recordation of a large amount of information without unduly increasing the size, and expense, of the recorder mechanism as well as the data processing facility.

SUMMARY OF THE INVENTION

The present invention comptemplates the plotting of information by means of an X-Y array of information points, or dots, with the intensity of each dot individually controlled for continuous tone or black-white display. The X-Y array is constructed by means of a pulsed, modulated laser beam deflected to scan a recording medium while also being deflected to construct an array of lateral raster line sweeps along the scan. Digital data is numerically scaled according to the resolution of the lateral raster sweep construction. The data may then be plotted in any one of several plotting modes. For example, the X-Y array of dots plotted may be presented in a wiggle mode, a variable area mode, a variable density mode, or a combination of such modes. In a variable density mode, data signal amplitudes may be represented by varying shades of gray of the dots.

All possible images which may be presented in any one raster sweep are preconstructed and stored. Then, in response to the processing of data to be recorded, the appropriate raster image information is retrieved and utilized in controlling the modulation of the recording laser beam at the appropriate location of intersection of the laser beam with the recording medium.

A laser light beam is operated on by an intensity modulator which both chops the light beam into a sequence of pulses and modulates the intensity of each pulse to correspond to information to be recorded. Deflecting devices are provided which deflect the laser beam to carry out the scan of the recording medium while undergoing a series of lateral raster sweeps. The result is that the possible points of intersection of the laser beam with the recording medium define an area as long as the scan length and as wide as the raster sweep height. A system of lenses is provided for shaping and focusing the laser beam as needed to accomodate the intensity modulator and the deflector devices, and to focus the modulated laser beam pulses into the recording medium.

The recording medium itself may be a photographic film strip. A segment of the film strip is positioned for exposure to the laser beam during one scan with raster structure. At the completion of such a scan, the film is advanced a preselected amount to receive the next scan. Where a dry process film is used, a heater may be provided to carry out the developing of the film.

The intensity modulation and deflection of the laser beam, as well as the manipulation of recording medium are controlled by a plotter controller. Appropriate control signals are generated by the plotter controller to operate electronic controls of the modulator, deflecting devices, and film manipulating devices. Such signals are produced in response to information and control signals provided to the plotter controller in accordance with input data and preselected control parameters, respectively.

The input data may be processed by a data processor, or computer, which also receives the control parameters. A data format, or plotting mode, is selected, and the data processor then evaluates the input data in accordance with the chosen format. Timing and imaging parameters are input to the data processor, and stored in a memory available to the plotter controller. Additional control parameters, including, for example, instructions as to the pulsing of the laser beam and the control of the scan and raster sweep operations of the laser beam, are also input to the data processor.

Where the data input is in the form of individual data traces, or corresponding numerical information, the data processor handles a complete trace at the same time. The data signal is scaled and segmented both vertically and horizontally according to the X-Y array of information points available at the recording medium. With the data format chosen, the data processor assigns addresses to each of the scaled data segments which, when combined, represent the input data signal, where such addresses may be found in the memory storing the raster imaging information. The data information signals for a complete data trace are then transmitted to the plotter controller which retrieves the necessary imaging information from the memory corresponding to the addresses assigned in the information signal. The plotter controller combines the data information signals from the data processor with the raster imaging information to produce control information signals. At the same time, appropriate control instructions are provided the plotter controller from the data processor. The plotter controller then transmits information and control signals to the beam and medium control devices. The laser beam is pulsed and manipulated to carry out a scan complete with lateral raster sweep structure. As the deflection devices are operated to maneuver the point of intersection of the laser beam with the recording medium along a raster sweep line, the pulsed laser beam is intensity-modulated in accordance with the information contained in the corresponding data input signal segment, and according to the data format, or plotting mode, selected. Thus, a complete plot of a processed data input signal is effected with one scan of the laser beam.

The data processing and plotting operations may be separated and carried on independently by the data processor and the plotter controller, respectively. To take advantage of this situation, and to prevent one such operation from interfering with the other, a computer interface is provided for receiving the processed data information signals from the data processor and transmitting information and control signals on to the plotter controller. The computer interface is capable of suspending the transmission of signals from the data processor until the plotter controller has completed the plotting of the previous information signals, and is ready to begin the next scan.

Apparatus and methods according to the present invention provide means for rapidly plotting high volumes of information. In particular, a two-dimensional presentation of information is recorded according to the present invention in a single scan, with raster sweep structure, by the light beam moving across the recording medium. While information corresponding to complete data signals may be thus plotted in a single scan, adjacent scans may be positioned on the recording medium to permit the overlap of plots of different information traces.

DESCRIPTION OF PREFERRED EMBODIMEMTS

Figure 1:
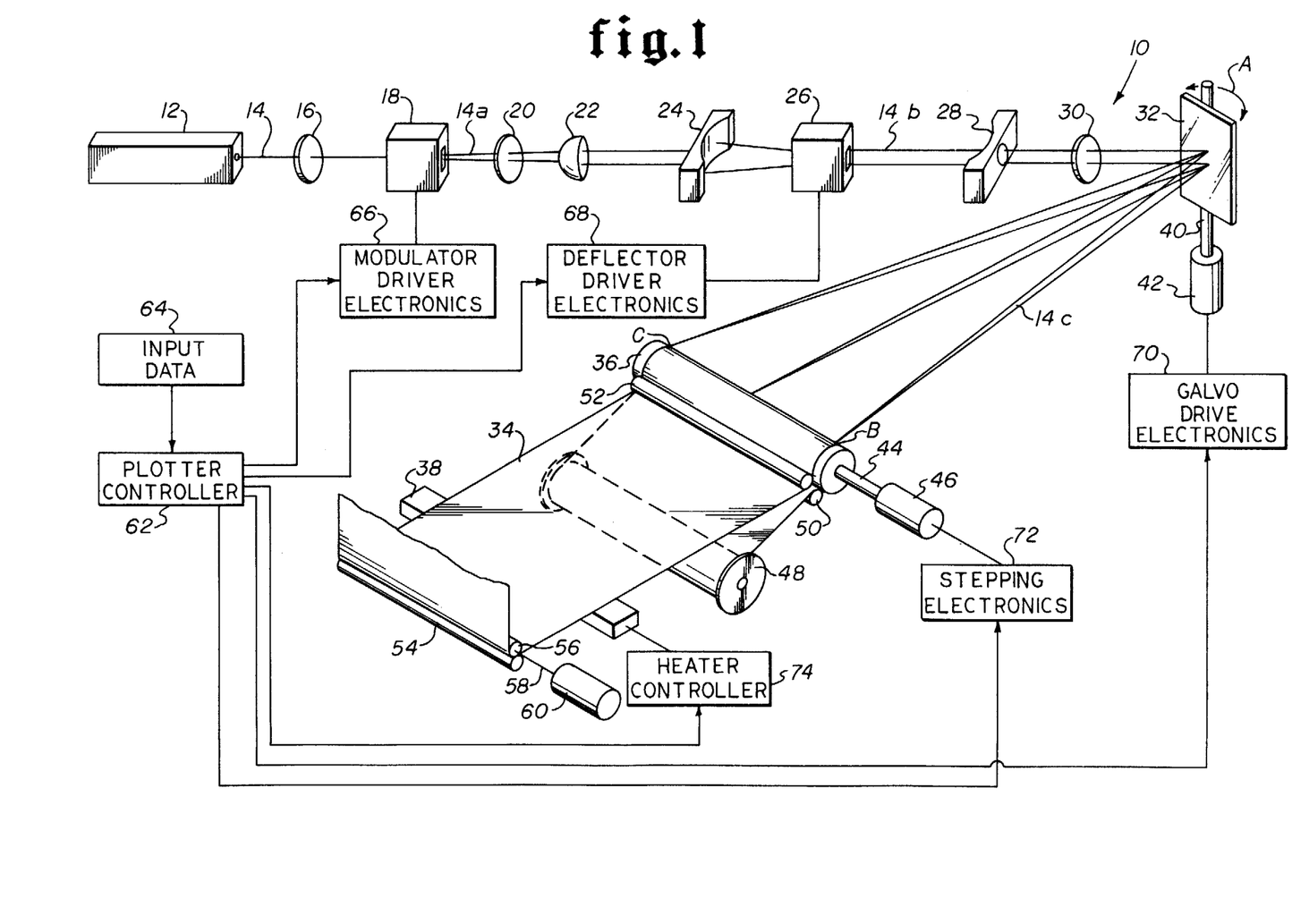
FIG. 1 is a schematic representation showing optical and control devices of a laser plotter according to the present invention.

Optics and control devices of a laser plotter according to the present invention are shown generally at 10 in FIG. 1. A light source is used to generate a light beam with sufficient power to expose the recording medium to maximum density at the plotting rates achieved by the plotter. Here, a laser 12 is used for that purpose. The generated laser beam 14, being a single-frequency light, may be operated on by the optical devices of the present invention with virtually no chromatic aberration.

The laser beam 14 is reduced in diameter by a reducing lens 16 for passage through an acousto-optical modulator 18. As discussed hereinafter, the modulator 18 is driven to modulate the intensity of the first order of the laser beam in accordance with information to be recorded. The modulation is carried out at a band pass frequency necessary to maintain the dot resolution required. The intensity modulator 18 also chops the laser beam into a series of pulses. The laser beam 14a emerging from the modulator 18 is thus a series of pulses, each pulse being intensity-modulated to carry information to be recorded. The modulated laser beam 14a is then expanded by a lens 20, and passed through a collimating lens 22, and is shaped by a positive cylindrically-focusing lens 24 for input to a second acousto-optical modulator 26.

The second modulator 26 is driven to operate as a beam deflector, and deflects the beam virtually (as viewed in FIG. 1) back and forth in precise increments to define the raster sweep and flyback, as described hereinafter. The first order pulsed laser beam 14b emerging from the deflection modulator 26 is intensity-modulated as well as being continually deflected in an oscillatory fashion at a frequency determined by the period of the raster sweep.

The laser beam 14b is then expanded to a uniform diameter by a negative cylindrical lens 28 and passed through a spot-forming focusing lens 30. The converging laser beam is deflected by a scanning mirror 32 onto a recording medium 34. Here, the recording medium 34 is a strip of photographic film which is passed around a cylindrical platen 36. The film 34 is exposed by the laser cylindrical light at the platen 36, and the exposed segment of the film is then passed over a heater 38 which causes the exposed film to develop.

The scanning mirror 32 is mounted on a shaft 40 driven in a rotary fashion by a scanning motor 42. The motor 42 is controlled, as described hereinafter, to cause the shaft 40 and attached mirror 32 to oscillate about an arc as indicated by the arrows A. The extent of the arc A is such that the laser beam 14b striking the mirror 32 is deflected to the film 34 on the platen 36 to transversely scan the film strip from one extreme beam location B to the other C as shown. Thus, the laser beam 14c reflected by the scanning mirror 32 is pulsed, intensity-modulated, deflected to effect raster sweeps, and deflected to scan the recording film 34. The focal plane of the focusing lens 30 is at the surface of the film 34 on the platen 36 at the average distance: from the lens 30 to the scanning mirror 32, to the line along the film defined by points B and C.

As the scanning mirror 32 causes the laser beam 14c to scan across the film 34 from B to C, operation of the modulator 26 on the laser beam causes the point of intersection of the laser beam 14c with the film to sweep a raster construction back and forth perpendicular to the line from B to C. The result is a transverse scan of the film 34 in the direction from B to C that is as wide perpendicular to the direction B-C as the raster sweep deflections effected by the modulator 26. A representation of such a scan with raster structure is shown in FIG. 2, where the positions B and C are indicated on a section of film 34.

The line structure 43 represents the possible locus of points of intersection of the beam 14c with the film 34 during a single scan. Details of this locus are shown in the insert FIG. 2A. There, the heavier, slanted line segments 43a show the path of intersection wherein the laser beam may be intensity-modulated to record information on the film 34. The lighter line segments 43b represent the flyback pattern whereby the laser beam is deflected to a position to start the next sweep for recording. During the flyback along lines 43b, the laser beam intensity is reduced to zero by the intensity modulator 18. Thus, as the mirror 32 rotates to effect one scan of the laser beam 14c from B to C along the film 34, the deflector modulator 26 causes the laser beam to oscillate perpendicularly to the scan direction B-C to sweep out the intersection path identified by lines 43a and 43b. Thus, rather than producing but a single line scan along the direction B-C, the laser beam 14c intersects the film 34 along a strip of measurable width.

In a typical application, the length of the scan B-C may be twenty-two inches, with the height of the raster sweep (measured by the vertical projection of lines 43a and 43b) one-half inch. One recording raster sweep 43a may be completed in approximately 40 $\mu$sec., while the raster flyback 43b takes approximately 2 $\mu$sec. Thus, the flyback lines 43b appear more nearly vertical than do the recording sweep lines 43a. The scan time (from B to C) is approximately 220 milliseconds, while scan flyback (to position the laser beam to start the next scan) takes about seven milliseconds. During the scan flyback, the laser beam is reduced to zero intensity by the intensity modulator 18.

Figure 2:
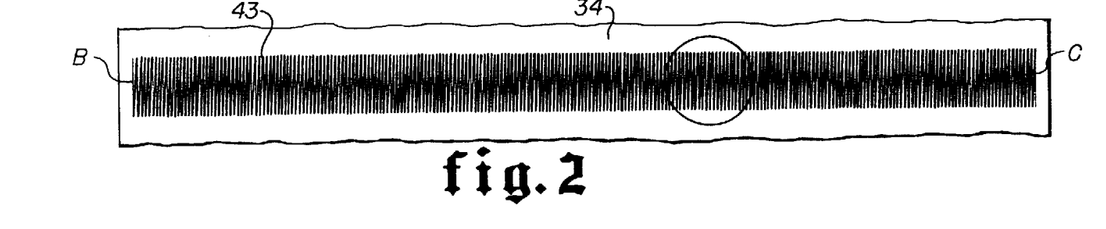
FIG. 2 is a symbolic representation of a portion of a recording medium for use with the present invention, indicating the possible path of the point of intersection of the laser beam with the recording medium.
Figure 2A:
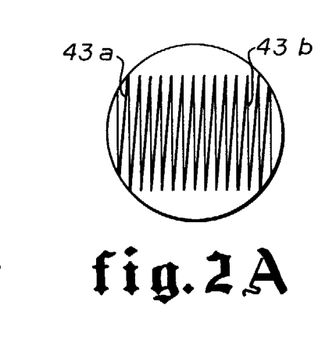
FIG. 2A is an enlargement of a portion of the raster sweep line structure shown in FIG. 2.

The representation of raster sweep lines 43 and 43a in FIGS. 2 and 2A is symbolic only, and not intended to indicate actual sweep line orientation or spacing. Furthermore, the sweep lines 43a may be made perpendicular to the direction B-C by appropriately tilting one or more optical devices, say 24–28. Because of such tilting, and/or the high density of sweep lines 43a, information may be recorded without distortion.

The platen 36 is connected to a shaft 44 of a stepping motor 46. After each structured scan is completed, as indicated in FIG. 2, the stepping motor 46 is driven to advance the platen 36 rotationally a predetermined amount. This operation of the platen 36 advances the film 34 by such an amount, and presents the next segment of the film for exposure to the laser beam 14c. The film is drawn from a supply reel 48 which may be equipped with an appropriate drag mechanism (not shown) to prevent the film from running slack between the reel 48 and the platen 36. Another guide roller 54 presses the film 34 firmly against a take-up roller 56 connected to the shaft 58 of a torque motor 60. As the stepping motor 46 advances the film 34 an increment, the torque motor 60 responds to the decrease in film tension by rotating the take-up roller 56 to move the film to a take-up reel or other receiving apparatus (not shown).

As the film 34 exposed to the laser beam 14c is advanced by rotation of the platen 36, the film passes over the aforementioned heater device 38 where the increased temperature to which the film is exposed effects the development of the film. Thus, the film that is advanced beyond the take-up roller 56 is exposed and developed, and immune from change due to further exposure to light. Thus, only that portion of the film 34 positioned from the heater 38 back to the supply reel 48 need be maintained in a light-type environment, except, of course, for exposure to the laser beam 14c.

A plotter controller 62 receives input data 64 in the form of data information signals and control signals. The data information signals embody the information to be recorded on the film 34 in the form of electronic signals which the plotter controller 62 modifies, as noted hereinafter, to produce information control signals which are transmitted to modulator driver electronics 66. The modulator driver 66 converts the information signals into radio frequency signals which are transmitted to the acousto-optic modulator 18. There, the rf electromagnetic signals drive an appropriate transducer to produce rf acoustic signals which are impressed on a glass medium carrying the laser beam. As the signals produced by the driver 66 are made to vary in reponse to the information signals from the plotter controller 62, the acoustic signals vary accordingly to interfere with the laser beam, thereby modulating the intensity of the first order refracted beam to correspond to the information signals. The modulator driver 66 is also operated, by way of appropriate information signals, to cause the modulator 18 to reduce the laser beam intensity to essentially zero, effectively shutting off the laser beam during periods when no information is to be recorded on the film 34. Thus, for example, when the scanning mirror 32 is returning from its position in which the laser beam may be reflected to the point C, that is, when the scanning mirror is effecting a scan flyback, no information can be recorded, and the laser beam intensity is reduced to zero. During that same period, the stepping motor 46 is caused to advance the platen 36 rotationally, as described hereinbefore. Further, the modulator driver 66 is also operated to cause the modulator 18 to chop the laser beam 14 into a series of pulses.

The deflecting acousto-optical modulator 26 is operated by way of deflector driver electronics 68. The deflector driver 68 receives control signals from the plotter controller 62 in the form of raster sweep information signals. The raster sweep signals are converted by the deflector driver electronics 68 into appropriate rf electronic signals transmitted to the modulator 26 wherein acoustic signals are produced to interfere with the first order refracted laser beam to oscillate the laser beam vertically, as viewed in FIG. 1, to produce the raster recording sweep and flyback indicated in FIGS. 2 and 2A.

The scanning motor 42 may be of any type of motor whereby the output shaft 40 may be operated in an oscillatory manner. Thus, a galvanometer drive type motor 42 may be used wherein the motor operates in one rotational sense or the other in response to input current signals in one sense or the other. Such input current signals are provided by galvanometer drive electronics 70 which generate the necessary current signals to operate the motor 42 in response to control signals received from the plotter controller 62. The galvanometer drive signals from the plotter controller 62 thus signal the galvanometer drive electronics 70 to operate the scanning motor 42 to cause the laser beam 14c to scan the film 34 from B to C, then to rotate in the reverse direction to return to the original position for reflecting the laser beam to the point B, that is, to effect the scan flyback.

The plotter controller 62 also generates, in response to control instructions received, film-advance control signals transmitted to stepping electronics 72 which operate the stepping motor 46. Thus, when a scan by the laser beam 14c has been completed, and as the scanning mirror 32 is being returned to its position for starting another scan, the stepping electronics 72 are signaled by the plotter controller 62 to produce an appropriate voltage signal to operate the stepping motor 46 for a predetermined amount, thereby advancing the platen 36 and film 34 a predetermined increment.

The plotter controller 62 also controls a heater controller 74 to operate the heater 38. Whenever the laser plotter 10 is being operated to record information on the film 34, the heater 38 is thus activated and maintained in operation by the plotter controller 62, in response to control signals, until the last segment of the film to be exposed to information-carrying laser light has been advanced over the heater for developing.

It will be appreciated that the operations of the control electronic circuitry components 66 through 74 are synchronized by way of the control signals from the plotter controller 62. Thus, as the galvanometer drive electronics 70 cause the scanning mirror 32 to reflect the laser beam 14c in a scan from B to C across the film 34, the deflector driver 68 operates the deflector modulator 26 to effect the appropriate oscillatory motion of the laser beam to sweep through the raster structure. At the same time, the modulator driver 66 is pulsing the laser light and impressing the information to be recorded on the laser beam by way of the intensity modulator 18 varying the laser light intensity. During each raster flyback, the intensity modulator 18 reduces the laser beam intensity to avoid exposing a trace on the film 34. While these operations are occuring, the stepping electronics 72 are in a hold configuration, not operating the stepping motor 46, and the heater 38 is either activated to develop previously exposed film segments, or is awaiting the arrival of the first exposed film segment.

The transmission of information, to be recorded during the scan, to the laser beam by way of the intensity modulator 18 is completed by the time the scanning mirror 32 has been rotated to reflect the laser beam to C. Then, further transmission of such information to the modulator driver 66 ceases, and the modulator driver operates the modulator 18 to reduce the intensity for the scan flyback. With this done, the galvanometer drive electronics 70 reverses the direction of operation of the scanning motor 42, and causes this motor to rapidly return the scanning mirror 32 to its original orientation. At the same time, the stepping electronics 72 operate the stepping motor 46 to advance the platen 36 to align the film 34 for the next scan by the laser beam 14c. As described hereinbefore, the torque motor 60 receives and advances the film 34. The apparatus is then ready for the next scan. The modulator driver electronics 66 receives the information control signals to so operate the intensity modulator 18 to impress information to be recorded on the laser beam in the form of intensity modulations, and the deflector modulator 26 and the scanning motor 42 are operated to once again sweep and scan the laser beam 14c across the film 34.

Figure 3:
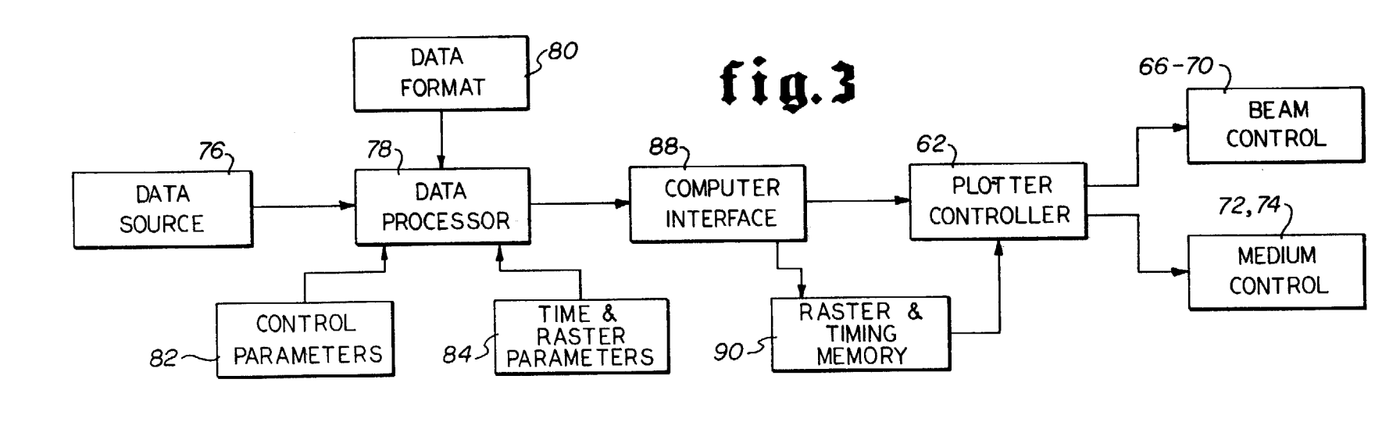
FIG. 3 is a block diagram indicating various components used for handling data and control signals, as well as illustrating a technique for providing various instructions for controlling the plotter.

A technique for assimilating information and control instructions in accordance with the present invention may be appreciated by reference to FIG. 3. Information to be recorded is provided by a data source 76, which may take a variety of forms. For example, seismic readings obtained by way of geophone, in a seismological exploration operation may be recorded and stored on magnetic recording tape or some other appropriate medium. The raw data may be processed, usually by computer, to convert the information to more useful form and/or to remove unwanted signals to enhance the appearance of information sought. Such techniques are known in the art, and are not described in further detail herein. The information, whether pre-processed or raw, is presented to a data processor 78. The processor 78 may be a general purpose computer whereby the data may be put into a format for recording by the laser plotter. With the data processor 78 being a digital computer, the data source 76 provides the data in digital form. Format information is preselected and input into the data processor 78 as indicated at 80. The format information determines the mode in which the processed data is recorded on the film 34, as discussed in more detail hereinafter. The data processor 78 thus generates a series of data information signals, corresponding to data signals as received from the data source 76, and including data format information.

Control parameters 82 are input to the data processor 78. Such control parameters include the necessary information to generate the various signals for operating the optical modulators and motors of the laser plotter. Thus, the degree of operation of the deflector modulator 26 and the scanning motor 42 necessary to effect a complete scan with raster structure, as well as the size of the stepping increment effected by operation of the stepping motor 46, the rate at which the intensity modulator 18 must be operated to transfer to the laser beam complete information for one scan, and the form of the corresponding control signals for operating the drive electronics, are embodied in the control parameters 82.

The control parameters 82 also include imaging information whereby the laser beam is broken into a series of pulses by the intensity modulator 18. Thus, as noted hereinbefore, the intensity modulator 18 also serves as a light chopper, and passes a light beam 14a that comprises a series of pulses, with the intensity of each pulse determined according to the corresponding information signal transmitted, ultimately to the modulator driver 66. The plotter 10 is therefore capable of producing a matrix of dots as long as the scan (from B to C) and as wide as the raster height, with the dot density being size- and resolution-limited. Typically, 128 dots may be exposed along one raster sweep line 43a (FIG. 2A) in a one-half inch high raster.

Figure 4:
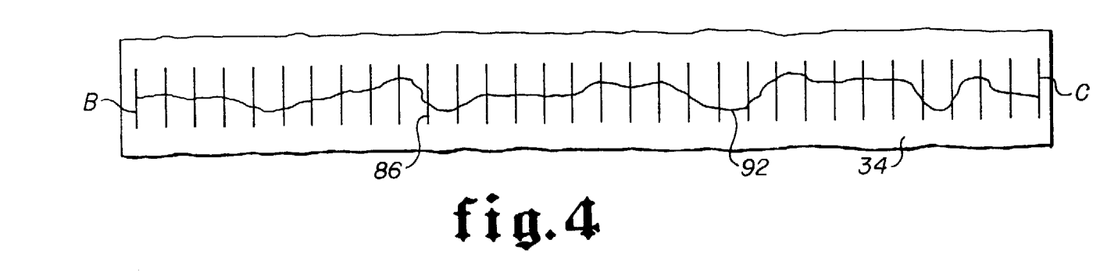
FIG. 4 is a representation of a portion of a recording medium on which an information signal has been plotted.

With the data format 80 chosen, all possible combinations of dot patterns corresponding to the particular format selected are constructed by the data processor 78 according to instructions, as indicated at 84. Also placed in the data processor 78 is timing, or grid line information as preselected. Such grid line information is also used to operate the modulator driver 66 to control the intensity modulator 18 so as to cause the laser beam to print out grid lines 86 on the film 34, as seen in FIG. 4. The grid lines may be used as a time, depth, or other type scale.

With the data information signals now encompassing the format information, and the various control parameters as well as time and raster parameters available, the data processor 78 may proceed to forward both control and data information signals to the plotter controller 62 to effect operation of the various control devices of the plotter of the present invention to effect the recording of information on the film 34. However, a more efficient operation may be carried out with the use of a computer interface 88 in the form of a programmable microcontroller. Data information and control signals are forwarded to the computer interface 88 from the data processor, and are in turn forwarded to the plotter controller 62. The data processor 78 and the plotter controller 62, in conjunction with the various modulation and control devices used in the laser plotter and shown in FIG. 1, may not be operating at the same rate to transmit signals, and to effect recordation of information, respectively. In such case, the computer interface 88 serves to temporarily suspend the transmission of signals from the data processor 78 until the plotter controller 62 signals the computer interface that it is in condition to receive further signals to effect plotting.

A raster and timing memory 90 is also provided whereby timing and raster array information, originally constructed in the data processor 78 and then sent to the computer interface 88, may be stored and called up as needed by the plotter controller 62. Thus, for example, grid line information as well as information to construct all possible dot raster combinations according to the format selected may be stored in the memory 90, and be available for the plotter controller 62 for use during each scan.

In response to the data information and control signals received by the plotter controller 62, the plotter controller produces corresponding information and control signals for transmission to the appropriate control devices shown in FIG. 1., as discussed hereinbefore. In particular, information and control signals are transmitted to the beam control devices 66-70, and control signals for manipulating the recording medium 34 are transmitted to the corresponding medium control devices 72 and 74.

The provision of the computer interface 88 between the data processor 78 and the plotter controller 62 permits the plotter controller to effect recordation of information while the data processor is reading and preparing the next information signals for transmission. When the plotter controller 62 is finished plotting a scan of information, the computer interface 88 is ordered to initiate the advance of data information and control signals necessary for the next scan. In this manner, the functions of plotting data and processing data may be overlapped, thus permitting the more rapid handling of information by the present apparatus, and the presentation of such information to the recording medium.

Typical input data from a data source 76, particularly in the case of seismic data, is in the form of a time sequence of data samples, with each sample being a signed number representing the displacement of a sinusoidal signal. These signals must be scaled in both the forward and transverse, that is X and Y, directions according to the plotting parameters, and converted to an X-Y array of dots in a dot grid domain. Such a process, according to the prior art, requires much time to generate the dot matrix for each trace. Furthermore, where adjacent trace signals may overlap, no trace data can be plotted until adjacent traces which may cross into the domain of the trace under consideration have been processed. Consequently, large areas of computer memory are required to store the information for the trace to be plotted as the information with respect to adjacent traces is being processed. Furthermore, according to such prior art techniques, the total amount of information that must be transmitted from the data processor to the plotting device in order to effect the plotting of a single line of information is large, thus imposing a heavy duty cycle load on the central processor unit of the computer used, thereby limiting its capability of performing concurrent operations.

According to the present invention, the task of generating dot raster images for each new input signal has been eliminated. Once the raster format, or mode, has been determined, all possible combinations of dot patterns for the Y deflections are constructed and stored in the memory 90, as noted hereinbefore. Similarly, information for constructing grid, or timing, lines is stored in the memory 90 in the form of the positions of such grid lines in an array in the X directions, as well as the heights of such lines. Thus, once the data processor 78 begins transmitting data information and control signals, all the raster and timing information is ready and available to the plotter controller 62, and need not be generated and stored individually for each data input signal. Large areas of computer storage are not required, and the data transmission rate between the data processor 78 and the plotter controller 62, through the computer interface 88, need accommodate only the transfer of information to be recorded and the accompanying control signals.

FIG. 4 is a representation of a plot of a complete data signal that may be obtained with the use of the present invention. By comparison with the line construction 43 shown in FIG. 2 to indicate the path of the point of intersection of the laser beam 14c which might be swept out across the film 34, it will be appreciated that a curve such as the line 92 may be plotted by appropriately varying the intensity of the laser beam 14c as the scan, with raster structure, indicated in FIG. 2 is carried out. In the case of curve 92, the intensity of the laser beam 14c is zero for all points except one during each sweep according to the raster lines 43a of FIG. 2A. For the one non-zero intensity point on each raster sweep 43a, the intensity modulator 18 may allow, for example, the maximum possible intensity of the laser beam. The result is a high contrast plot of a single curve 92. Actually, the thickness of the curve 92 may be varied by recording a cluster of two or more adjacent dots on each raster sweep 43a.

The grid lines 86 are constructed on the film 34 as the curve 92 is being plotted. Thus, as the laser beam 14c is directed along the raster sweep lines 43a, and from the position B to the position C, each grid line 86 is constructed as the point of intersection of the laser beam with the film is reached where the particular grid line is to be positioned. It will be appreciated that the height, thickness, and intensity of the grid lines 86 may all be controlled by way of the appropriate grid line parameters input at 84 to the data processor 78. Then, as the grid lines 86 are being constructed on the film 34, the laser beam 14c is controlled to produce grid lines as instructed. In FIG. 4, the grid lines 86 are constructed with the same height as that of the raster sweep, as indicated by the line structure 43 in FIG. 2.

Each data signal from the data source 76 may be processed and plotted in a single scan as the curve 92 in FIG. 4. According to prior art techniques, wherein no raster structure is provided during a single scan by the recording mechanism, a great number of individual scans would be required to produce the curve 92. Thus, if the maximum displacements of the curve 92 transverse to the direction of scan, that is, from position B to position C, represent a raster structure according to the present invention requiring, say, 100 dot exposures along the raster sweep lines 43a, then 100 individual scans would be required to produce curve 92 according to prior art techniques. According to the present invention, one scan with raster structure would be all that is needed to plot curve 92. Furthermore, adjacent curves, included in the data from the source 76, which may overlap, or come close to, curve 92 may also be accommodated according to the present invention without requiring more than one scan per curve.

Once a scan has been completed according to the present invention, the position on the film 34 of the next scan is determined by the extent to which the film is advanced by the stepping motor 46 acting under the control of the stepping electronics 72, in response to the corresponding stepping motor control signal received from the plotter controller 62. The extent of the film advancement is predetermined by the appropriate control parameter input to the data processor 78 at 82. Thus, the scan adjacent that by which curve 92 was constructed in FIG. 4 may overlap the scan and raster structure of curve 92, or may be positioned at virtually any distance along the film 34 away from the original scan position. Where information corresponding to overlapping data traces, or closely-lying traces are to be plotted, adjacent scan positions may be preselected to overlap. In such case, for example, another curve may be plotted within the bounds of the raster sweep height of the scan used to plot curve 92 in FIG. 4.

For convenience, the height of any grid lines used, such as 86 in FIG. 4, may be selected to coincide with the size of the film advancement effected by the stepping motor 46 between scans. In this way, a grid of continuous lines 86 may be constructed on the film 34, with no overlap of the lines as exposed on the film. In FIG. 4 the grid lines 86 have heights equal to that of the raster line structure 43 shown in FIG. 2. Then, if the film 34 is advanced by the stepping motor 46 a distance equal to the raster sweep height, such continuous grid lines, with no exposure overlap, will be obtained.

Figure 5:
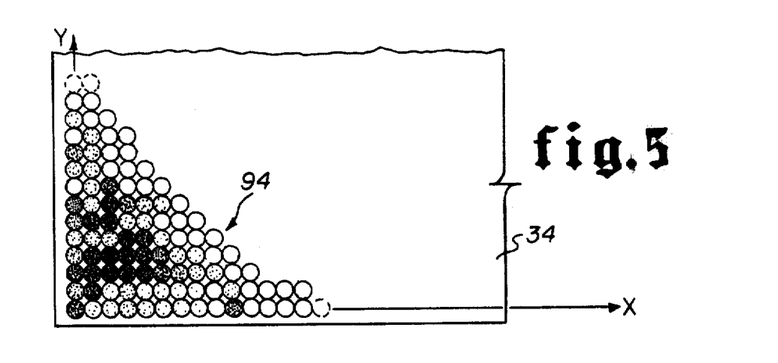
FIG. 5 is a symbolic representation of a portion of a dot array that may be recorded with the present invention.

FIG. 5 is a schematic representation of a portion of an X-Y array of dots that may be constructed according to the present invention. The dot array, indicated generally at 94, is shown superimposed on an X-Y coordinate system, with the X coordinate parallel to the scan direction from B to C in FIGS. 2 and 4, and the Y coordinate running generally along the raster sweep lines in the line structure 43 of FIG. 2. This enlarged representation is to indicate only the possible placement of the exposure dots in the array 94 on film 34 as well as to indicate the use of varying shades of gray to represent information. A vertical line of dots in the array at 94 corresponds to a plot along one of the raster sweep lines 43a of FIG. 2A. While the dots in the array at 94 are shown to be in mutual contact, the spacing between the center points of adjacent dots is limited by the dot size and dot resolution, a concept well known and not discussed in detail herein. As represented in FIG. 5, the dots in the array at 94 may range in shades of gray between the limits of clear and black.

Figures 6, 7, 8, 9:
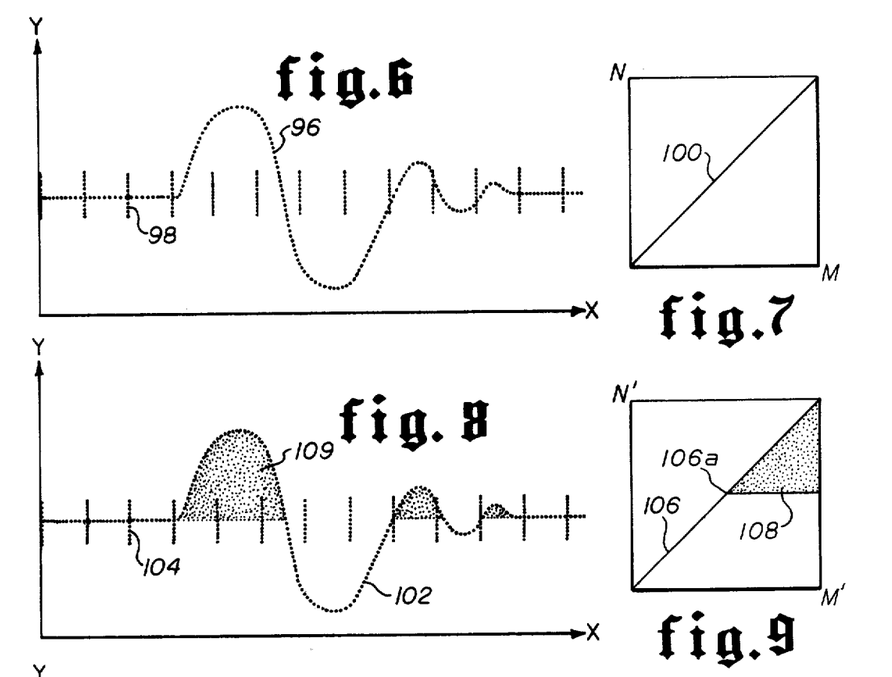
FIG. 6 is a representation of a recording in a wiggle mode.
FIG. 7 is a schematic representation illustrating a technique for storing raster imaging instructions for a wiggle mode.
FIG. 8 is a representation of a recording in a combination wiggle/variable area mode.
FIG. 9 is a representation similar to FIG. 7, illustrating storage of raster imaging instructions for a combination wiggle/variable area mode.

A variety of data formats, or plotting modes, may be utilized with the present invention. FIG. 6 is an enlarged representation of a portion of a recording in a wiggle mode, with an X-Y coordinate system superimposed. The curve 96 may be constructed of dark gray dots, and black dots used to construct an array of grid lines 98. Curve 96, which is in the same mode as curve 92 of FIG. 4, thus represents a data signal received by the data processor 78. It will be appreciated that such a recording closely resembles a graph that might be constructed by use of a pen recorder, with the exception that the recording of FIG. 6 is constructed with a series of exposure dots. In a wiggle mode, the intensity modulator 18 is operated to vary the density of the laser beam to effect high contrast in exposure of the film 34. Thus, where no dots appear in the X-Y array, the intensity of the laser beam during the raster sweep is zero. In the case shown in FIG. 6, therefore, only two non-zero intensity values are utilized by the plotter: one to plot the curve 96 and the other to construct the grid lines 98. However, the same shade of gray could be used for both curve 96 and lines 98.

FIG. 7 is a schematic representation illustrating the manner in which all possible raster images may be stored in the memory 90 of FIG. 3. The M-by-N straight-line graph 100 corresponds to a plot of raster sweep plotting instructions, along the N axis, as a function of raster memory addresses, along the M axis. The data signals received by the data processor 78 are scaled along the X direction by a number equal to the number of raster sweep lines 43a in a single scan. Each such segment of the data signal is evaluated by the data processor 78, and assigned an address depending on the information contained in that particular data signal segment. In the case of seismic data, for example, the information carried by such a single data signal segment will be in the form of a displacement along the Y direction, occurring at a particular X coordinate value. The address assigned such a data signal segment by the data processor 78 is a value that may be represented on the M axis of FIG. 7, for which the line 100 has a value along the N axis corresponding to the Y displacement information of the data signal segment. Thus, the data information signal transmitted by the data processor 78 through the computer interface 88 to the plotter controller 62 may be in the form of a sequence of addresses corresponding to points on the M axis of FIG. 7. The plotter controller 62 reads each address in the sequence and retrieves the instruction corresponding to a value along the N axis, as indicated by the line 100. The information control signal transmitted by the plotter controller 62 may then take the form, for example, of a series of pulses wherein the pulse heights correspond to a series of N axis values, which, in turn, correspond to Y direction displacements along the film 34. The modulator driver electronics 66 uses the pulse sequence to vary the radio frequency signal generated by the driver electronics and used to operate the intensity modulator 18 to maintain the intensity.

During the sweep along a single raster sweep line 43a (FIG. 2A) the modulator driver electronics 66 operates the intensity modulator 18 to maintain the intensity of the laser beam 14a output therefrom at zero except when the deflector modulator 26 is in a configuration to deflect the laser beam to a point along the line 43a corresponding to the Y displacement information contained in the data signal segment being plotted. Then, the information control signal transmitted to the modulator driver electronics 66 so alters the radio frequency signal transmitted to the intensity modulator 18 to provide a non-zero laser beam output intensity. In this way, by receiving such information control signals corresponding to Y, or N, direction displacement values as the plotter controller 62 also operates the beam deflection devices 26 and 32, the modulator driver electronics 66 and the intensity modulator 18 are able to impress the information to be recorded on the laser beam in the form of varying light intensity. Also, the information thus carried by the laser beam is in the format, or plotting mode, preselected.

FIG. 8 is a similarly enlarged representation of a plot of the same information recorded in the plot of FIG. 4, but presented in a combination wiggle/variable area mode. In this case, the curve 102 is identical to curve 96 of FIG. 6 with respect to displacement values, but the areas under the curve 102 and above an axis, parallel to the X axis and bisecting grid lines 104, is shaded. Thus, where the information may be represented by positive Y displacement values, the entire raster sweep line from the mid-point of the grid lines up to the value on the curve 102 is exposed to laser light of non-zero intensity. The lower limit of the shading is selected according to input control parameters 82.

Complete raster imaging information for such a wiggle/variable area mode as shown in FIG. 8 may be stored in the memory 90 according to a scheme as indicated by FIG. 9. An M'-by-N' straight-line graph 106 represents a plot of raster sweep plotting instructions, or Y direction displacement values along the N' axis as a function of memory addresses (or X direction position values) along the M' axis. However, in this case, one-eighth of the graph of FIG. 9 represented by the area 108 extending from the mid-point 106a of the line 106 is shaded. The area 108 represents stored instructions to cause the intensity modulator 18 to provide a non-zero intensity laser output beam 14a during the sweep along a raster sweep line 43a to the extent of the intersection of the area 108 with a vertical line passing through the address on the M' axis assigned to the data information signal by the data processor 78. Thus, for all addresses on the M' axis to the left of the mid-point 106a, only the curve 102 will be plotted. For all addresses along the M' axis to the right of the mid-point 106a, the curve 102 will be plotted with the area between the curve and the bisector of the grid lines 104 being shaded as at 109. The position of the point 106a may be changed to alter the extent of the shading in the plot of FIG. 8.

Figure 10:
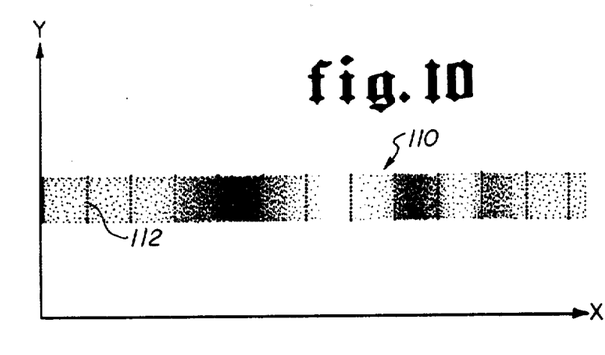
FIG. 10 is a representation of a recording in a variable density mode.

In FIG. 10, the same information shown recorded in FIGS. 6 and 8 is presented in a variable density mode. In such a plotting mode, all or a portion, as in FIG. 10, of the raster sweep height may be utilized for exposing the film 34 to non-zero laser light. The intensitites of dots constructed in the dot array at 110 of FIG. 10 correspond to various Y-direction displacements as plotted in FIGS. 6 and 8. Thus, in FIG. 10, maximum upward Y-direction displacement data values are represented by the most dense, or black tone, exposure dots, while maximum downward Y-direction displacement data values are represented by clear, or white tone, dots. Intermediate Y-direction displacement data values are represented by corresponding shades of gray between the limits of black and clear. A reverse convention may be used, wherein the largest positive displacement values are represented by the lightest shades of gray, and the largest negative displacement values are represented by the darkest shades of gray. Grid lines 112 are also superimposed on the variable density mode representation 110.

Figure 11:
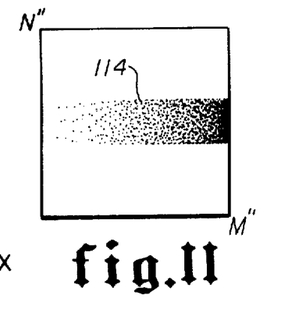
FIG. 11 is a representation similar to FIGS. 7 and 9, illustrating storage of imaging instructions for a variable density mode.

FIG. 11 is a representation indicating the manner in which complete raster imaging information for the variable mode used in FIG. 10 may be stored in the memory 90. Here, the imaging instructions are represented by a shaded band 114 on an M"-by-N" graph. Again, the positions along the M' axis represent addresses assigned to the individual data signal segments by the data processor 78 in accordance with the information carried thereby. Also, values along the N" axis represent positions along the Y-direction of the raster sweep by the laser beam. The imaging instructions represented by the band 114 includes instructions to vary the intensity of the laser beam to print a line of dots along a raster sweep line 43a where the intensity of the dots is determined by the position of the address along the M" axis. As shown symbolically in FIG. 11, for example, addresses to the right along the M" axis correspond to higher laser beam intensities, and darker shades of gray plotted on the film 34. Also, for a particular address along the M" axis, the vertical extent and position of the band 114 determines the vertical extent and position along the raster sweep direction for which a line of dots will be plotted in the array 110 of FIG. 10.

In addition to scaling the input data signals along the X direction to obtain data signal segments corresponding to individual raster sweep lines 43a, the input data signals are also scaled along the Y direction. In this case, the scaling factor is determined by the number of exposure dots the plotter can make on the film 34 along each raster sweep line 43a. This number of dots is also equal to the number of pulses into which the laser beam must be chopped for each raster line sweep.

It will be appreciated that the number of addresses required to store raster imaging instructions for any particular plotting mode must be as large as the number to which the data signals input to the data processor 78 are scaled corresponding to the Y-direction. Thus, if the input data signals are scaled along the Y-direction in the wiggle mode of FIGS. 6 and 7 to one part in 128, there must be M=128 addresses utilized. Similarly, with the raster sweep able to be constructed with 128 dots, the possible values N represented in FIG. 7 must also be 128. The same relationship of M'=N' applies also for the wiggle/variable area mode as represented by FIG. 9.

In the case of a variable density mode, such as that represented by FIG. 11, the number of addresses M" equals the number of different density values into which the data input signals are scaled. The laser plotter must be capable of varying the density of the laser beam 14 accordingly. Thus, for example, if the laser plotter is capable of distinguishing 128 different shades of gray, ranging from white to black, the data processor 78 may scale the input signals, corresponding to Y-direction displacement values, 1-to-128. A greater or lesser number of different shades of gray may be used, as desired, with the number of used addresses along the M" axis of the representation of FIG. 11 varying accordingly.

The number of values along the N" axis of FIG. 11 corresponds, as noted hereinbefore, to the number of possible dot exposures that may be constructed along a single raster sweep line 43a of FIG. 2A. Where the entire raster sweep height may not be utilized for plotting information, as in the case illustraded in FIG. 10, the "unused" positions along the N" axis represent positions along the raster sweep lines 43a for which the laser beam intensity is zero.

While 128, for example, different light intensity values may be represented in the raster image instructions stored in the memory 90 in the variable density mode, as illustrated in FIG. 11, such a variety of dot densities are not required for use in wiggle or variable area plotting modes. Thus, all of the points along the line 100 of FIG. 7 in the wiggle mode may represent dot exposures of the same intensity. Similarly, the points along the line 106 of the plotting mode illustrated in FIG. 9 may represent uniform dot exposure intensities, while the positions within the area 108 of FIG. 9 may represent dot exposures of a different density. Since only two non-zero dot exposure densities are utilized in this wiggle/variable area mode, the density variation instructions may be in the form of a value of, for example, a 4 bit word at the corresponding M' address. In this case, exposure dot density is a function of position in the raster sweep, and need not utilize any of the computer facilities for scaling the input data signals. By contrast, the variable intensity instructions used in the variable density mode of FIG. 11 are directly related to the Y direction scaling of the input data signals, with the values along the M" and Y axes corresponding to specific dot exposure density instructions.

The grid lines 98, 104, and 112 superimposed on the information plots of FIGS. 6, 8, 10, respectively are constructed with the use of timing, or grid line instructions stored in the memory 90, as discussed hereinbefore. Thus, the grid line parameters input at 84 include information to print a grid line of a particular density and height along a raster sweep line 43a at equally spaced positions along the X-direction on the film 34. Actually, the thickness of the grid lines may be adjusted by instructing the plotter controller 62 accordingly to print grid line exposure dots along more than one adjacent raster sweep line 43a. These grid line instructions are transmitted to the memory 90 along with the raster imaging information, and called up by the plotter controller 62 whenever a data information signal is passed thereto by the computer interface 88. Then, as the laser beam is deflected to sweep and scan across the film 34, information control signals to plot such information as shown recorded in FIGS. 6, 8, and 10 is forwarded to the modulator driver electronics 66 along with the corresponding control signals to plot the grid lines. Thus, the intensity modulator 18 varies the intensity of the laser beam 14 to plot both the information to be recorded, corresponding to the data input to the data processor 78, and at the same time print the grid lines. The grid lines may be of contrasting density relative to the curves 96 or 102, as well as the area 109. Similarly, in the variable density mode, the grid lines 112 may, for example, be constructed in black.

The present invention provides a digital laser plotter capable of recording information on any type of light-sensitive recording medium. Photographic film 34 with dry processing by way of the heater 38 has been described herein. However, wet processing of exposed photographic film may also be utilized according to the present invention.

The present invention also provides a technique for plotting high volumes of data in a more efficient and faster manner than available with prior art apparatus. In the present invention, information embodied in a complete data input signal may be processed and plotted in a single scan by the laser beam without the need for processing adjacent data signals which may overlap the first signal. Furthermore, information corresponding to the complete data signal is plotted without the need for multiple scans, since each scan includes lateral raster sweep structure whereby the combination of the scan deflection and the raster sweep deflection causes the laser beam to intersect the recording medium at all possible dot locations needed to plot the information.

The distance between adjacent scans may be controlled so that, in cases where data input signals do overlap, overlapping of plotted curves may be achieved on the recording medium. Thus, for example, in FIGS. 6 and 8, the next plot in each case may be effected by advancing the film 34 by way of the stepping motor 46 only a distance equal to the height of the grid lines 98 and 104, respectively. Such an operation will allow the next curves plotted in each case to overlap the ones shown in FIGS. 6 and 8, respectively. In the case of the variable density mode plot of FIG. 10, advancement of the film 34 by the stepping motor 46 may again be measured by the extent of the grid lines 112. In this case, a relatively continuous array of dots may be constructed, varying in density pattern from one band, such as that at 110, to the next.

Since complete raster imaging information is stored in the memory 90 prior to the processing and plotting of any data information, there is no requirement to construct raster sweep imaging instructions separately for each data signal segment as scaled along the X-direction. Furthermore, since each individual data signal may be processed and transmitted for plotting as a unit, with all imaging and control information available to the plotter controller 62, the task of processing the input data signals according to the preselected format may be carried out by the data processor 78 independently of the operation of plotting corresponding information signals as carried out by the plotter controller 62. Both of these operations may be conducted simultaneously, with the computer interface 88 controlling the transmission of a processed data information signal from the data processor 78 to the plotter controller 62 when the previously transmitted data information signal has been completely plotted.

As described herein, the various format, control, timing and raster parameters are, to a great extent, presented to the data processor in the form of computer instructions. Techniques to formulate computer software to effect such instructions are well known in the field, and are not further described herein. The data processor 78 forwards such instructions to the plotter controller 62 in the form of electronic signals. The plotter controller 62 is capable of producing appropriate control signals in the form of pulses or voltage level outputs to operate the beam control and medium control devices. Generation of such control signals may be accomplished according to well known techniques.

It will be appreciated that the optical devices shown in FIG. 1 may be varied while still effecting the present invention. For example, the scanning mirror 32 may be replaced by a prism or many-sided mirror. Then, the scanning motor 42 may be driven in a single sense to rotate the scanning optical device rather than to carry out oscillations. Similarly, a light chopper may be added to pulse the laser beam 14, thereby freeing the intensity modulator 18 from carrying out the light chopping task. Furthermore, the manner of manipulating the film 34 may be varied. For example, the film may be drawn over a flat platen rather than a cylindrical one as shown in FIG. 1. Also, the film 34 as well as the optical devices necessary may be contained in a light-type enclosure of virtually any design practical.

The foregoing disclosure and description of the invention is illustrative and explanatory thereof, and various changes in the method steps as well as the details of the illustrated apparatus may be made within the scope of the appended claims without departing from the spirit of the invention.

I claim:

1. Apparatus for recording information comprising:
   (a) a light source;
   (b) intensity modulation means for selectively modulating light from said light source over a selected range of intensity values in accordance with information to be recorded;
   (c) first deflection means for selectively and repetitively deflecting said light from said light source along a first direction; and
   (d) second deflection means for selectively deflecting said light from said light source along a second direction such that said first and second deflection means cooperate for causing said light from said light source to scan a recording medium along a scan direction while sweeping back and forth generally transverse to said scan direction such that the possible points of intersection of said light with said recording medium define an area on said recording medium the extent of which area along said scan direction is determined at least in part by said light deflection along said second direction, and the extent of which area transverse to said scan direction is determined at least in part by said light deflection along said first direction.

2. Apparatus as defined in claim 1 wherein said intensity modulation means comprises acousto-optic modulation means.

3. Apparatus as defined in claim 1 wherein said first deflection means comprises acousto-optic modulation means.

4. Apparatus as defined in claim 1 wherein said second deflection means comprises selectively movable light reflecting means.

5. Apparatus as defined in claim 1 further comprising:
   (a) data processing means for receiving data input, data format information, control parameters and imaging instructions, for scaling said input data corresponding to said scan and sweep operations by said light from said light source, and for producing data information signals and control instructions;
   (b) plotter controller means for receiving said data information signals and control instructions, for receiving said imaging instructions, for producing control information signals and for producing control signals;
   (c) memory means for receiving and storing said imaging instructions from said data processing means, and for transmitting said imaging instructions to said plotter controller means;
   (d) modulation drive means for receiving said control information signals and for operating said intensity modulation means for so selectively modulating light from said light source;
   (e) first deflection drive means and second deflection drive means for receiving said control signals, and for operating said first and second deflection means, respectively, to so selectively effect said sweep and scan operations by said light from said light source;
   (f) medium manipulation means for receiving said control signals and for selectively advancing said recording medium; and
   (g) interface means for receiving data information signals from said data processing means and for transmitting said signals to said plotter controller means.

6. Apparatus as defined in claim 1 wherein said intensity modulation means also pulses said light from said light source.

7. Apparatus as defined in claim 1 further comprising means for developing said recording medium after exposure to said scan and sweep operations by said light from said light source.

8. Apparatus as defined in claim 1 further comprising light-tight housing means for enclosing said recording medium for exposure to said light from said light source.

9. Apparatus as defined in claim 1 wherein said light source comprises a laser light source.

10. Apparatus as defined in claim 1 further comprising control means for selectively operating said intensity modulation means, and said first and second deflection means.

11. Apparatus as defined in claim 10 further comprising data processing means for receiving data input and data format information, for scaling said input data corresponding to said scan and sweep operations by said light from said light source, and for producing data information signals for transmission to said control means for use in said operation of said intensity modulation means.

12. Apparatus as defined in claim 11 further comprising interface means for controlling the transmission of signals generated by said data processing means to said control means.

13. Apparatus as defined in claim 1 further comprising recording medium manipulation means.

14. Apparatus as defined in claim 13 further comprising control means for selectively operating said intensity modulation means, said first and second deflection means, and said recording medium manipulation means.

15. Apparatus as defined in claim 14 wherein said control means comprises:
   (a) intensity modulation driver means for selectively operating said intensity modulation means for so selectively modulating said light from said light source;
   (b) first deflector driver means for operating said first deflection means for so selectively deflecting said light from said light source along said first direction; and
   (c) second deflector driver means for operating said second deflection means for so selectively deflecting said light from said light source along said second direction.

16. Apparatus as defined in claim 15 wherein:
   (a) said recording medium comprises a light-sensitive strip medium;
   (b) said recording medium manipulation means comprises means for selectively advancing said strip medium for exposure to said scanning and sweeping light from said light source; and
   (c) said control means further comprises stepping control means for operating said means for selectively advancing said strip medium.

17. Apparatus as defined in claim 16 wherein:
   (a) said recording medium further comprises photographic film;
   (b) said medium manipulation means further comprises film development means for developing said photographic film; and
   (c) said control means further comprises developer control means for operating said film development means.

18. Apparatus as defined in claim 14 further comprising memory means for storing information retrievable by said control means.

19. Apparatus as defined in claim 18 wherein said information to be stored in said memory means includes imaging information.

20. Apparatus as defined in claim 18 further comprising processing means for receiving data input and data format information, and for scaling said input data corresponding to said scan and sweep operations by said light from said light source.

21. Apparatus as defined in claim 20 further comprising interface means for receiving signals generated by said data processing means and for transmitting said signals to said control means.

22. A light plotter comprising:
   (a) a light source for producing a beam of light;
   (b) means for pulsing said light beam;
   (c) intensity modulation means for selectively modulating the intensity of said light beam to produce a beam of pulses of selected intensities;
   (d) first deflection means for selectively and repetitively deflecting said light beam along a first direction;
   (e) second deflection means for selectively deflecting said light beam along a second direction such that said first and second deflection means cooperate for causing said pulsed light beam to scan a recording medium along a scan direction while sweeping back and forth generally transverse to said scan direction to define a generally two-dimensional array of possible points of intersection of said pulsed light beam with said recording medium for each scan wherein the length of said array along said scan direction is determined at least in part by the beam deflection along said second direction, and the width of said array transverse to said scan direction is determined at least in part by said beam deflection along said first direction;
   (f) medium manipulation means for selectively advancing said recording medium between scans of said medium for exposure to scanning and sweeping by said pulsed light beam; and
   (g) control means for operating said means for pulsing said light beam, said intensity modulation means, said first and second deflection means, and said medium manipulation means.

23. A light plotter as defined in claim 22 wherein said intensity modulation means comprises acousto-optic modulation means.

24. A light plotter as defined in claim 22 wherein said first deflection means comprises acousto-optic modulation means.

25. A light plotter as defined in claim 22 wherein said second deflection means comprises selectively movable light reflection means.

26. A light plotter as defined in claim 22 wherein:
   (a) said recording medium further comprises photographic film;
   (b) said medium manipulation means further comprises film development means for developing said photographic film; and
   (c) said control means further comprises developer control means for operating said film development means.

27. A light plotter as defined in claim 22 further comprising light-tight housing means for enclosing said recording medium for exposure to said pulsed light beam.

28. A light plotter as defined in claim 22 wherein said light source comprises a laser light source.

29. A light plotter as defined in claim 22 wherein said control means further comprises:
   (a) a plotter controller for producing control signals and information signals, which information signals carry information to be plotted;
   (b) modulation drive means for receiving said information signals and for so selectively modulating the intensity of said light beam whereby said beam of pulses carries said information to be plotted;
   (c) deflection drive means for receiving control signals from said plotter controller and for operating said first and second deflection means for so causing said pulsed light beam to scan and sweep said recording medium; and
   (d) medium manipulation drive means for receiving control signals from said plotter controller and for operating said medium manipulation means for so selectively advancing said recording medium.

30. A light plotter as defined in claim 29 wherein said intensity modulation means is further said means for pulsing said light beam.

31. A light plotter as defined in claim 29 wherein said intensity modulation means comprises acousto-optic modulation means.

32. A light plotter as defined in claim 29 wherein said first deflection means comprises acousto-optic modulation means.

33. A light plotter as defined in claim 29 wherein said second deflection means comprises selectively movable light reflection means.

34. A light plotter as defined in claim 29 wherein:
(a) said recording medium further comprises photographic film;
(b) said medium manipulation means further comprises film developement means for developing said photographic film; and
(c) said control means means further comprises developer control means for receiving control signals from said plotter controller and for operating said film developement means.

35. A light plotter as defined in claim 29 wherein said plotter controller so produces said information signals based on data information signals, including data format information, formulated for transmission to said plotter controller by data processing means, said information signals also being based on imaging information provided to said plotter controller by memory means.

36. A light plotter as defined in claim 35 further comprising interface means for receiving said data information signals from said data processing means and for transmitting said data information signals to said plotter controller.

37. A method of recording information comprising the following steps:
(a) providing said information in the form of information signals carrying said information;
(b) providing a light beam;
(c) modulating the intensity of said light beam according to information so carried by said information signals;
(d) repetitively deflecting said light beam along a first direction to produce a lateral sweep pattern;
(e) deflecting said light beam along a second direction to produce a scan along a scan direction generally transverse to sweep lines of said sweep pattern; and
(f) exposing a light-sensitive recording medium to said modulated light beam which thereby scans said medium along said scan direction while effecting said lateral sweep pattern on said medium.

38. A method as defined in claim 37 further comprising the additional step of pulsing said light beam.

39. A method as defined in claim 37 wherein said light beam so provided is a laser light beam.

40. A method as defined in claim 37 further comprising the additional steps of:
(a) pulsing said light beam to provide an array of possible exposure dots at possible points of intersection of said pulsed light beam with said recording medium whereby the possible exposure dots lie along sweep lines positioned along said scan direction;
(b) scaling a data input signal, including said information to be recorded, to divide said input signal into data signal segments corresponding to said sweep lines, and scaling said data signal segments corresponding to said exposure dots along said sweep lines;
(c) providing image information, including information for the construction of information signals for the recording of all possible information according to a selected plotting mode;
(d) producing said information signals by combining said data signal segments with corresponding information from said image information whereby said information signals comprise a sequence of instructions for so modulating the intensity of said pulsed light beam to provide exposure dots, along sweep lines, of intensities determined by information to be recorded, included in corresponding data signal segments, and in accordance with said plotting mode.

41. A method as defined in claim 40 wherein said plotting mode is a wiggle mode.

42. A method as defined in claim 40 wherein said plotting mode is a variable area mode.

43. A method as defined in claim 40 wherein said plotting mode is a variable density mode.

44. A method as defined in claim 37 further comprising the additional steps of:
(a) providing a plotter controller for producing said information signals;
(b) operating light intensity modulation means with said information signals to so modulate the intensity of said light beam;
(c) producing control signals by said plotter controller; and
(d) operating light deflection means with said control signals to so deflect said light beam along said first and second directions.

45. A method as defined in claim 44 further comprising the additional steps of:
(a) providing plotting mode instructions whereby the format for recording said information is determined;
(b) scaling data input, including said information to be recorded, according to the scan and sweep pattern of said light beam, dividing said data input into data segments corresponding to the sweep lines in said sweep pattern;
(c) producing data information signals including signal information for each such data segment according to said plotting mode;
(d) providing said data information signals for said plotter controller;
(e) providing image information, including information for the construction of information signals for the recording of all possible information in the determined recording format; and
(f) so producing said information signals by said plotter controller by combining said data information signals with corresponding information from said provided image information.

46. A method as defined in claim 45 wherein said recording format is a wiggle mode.

47. A method as defined in claim 45 wherein said recording format is a variable area mode.

48. A method as defined in claim 45 wherein said recording format is a variable density mode.

49. A method as defined in claim 45 further comprising the additional steps of:
(a) pulsing said light beam, then so modulating the intensity of said light beam by selectively varying the intensities of the pulses; and (b) further scaling said data input according to the pulses within the lateral extent of one sweep in said sweep pattern used to so record information.

50. A method as defined in claim 49 further comprising the additional step of:
   (a) providing interface means for receiving said data information signals and transmitting said data information signals to said plotter controller; and
   (b) providing memory means for storing said image information, and from which said plotter controller may retrieve said image information.

51. A method as defined in claim 50 wherein said light beam so provided is a laser light beam.

52. A method of recording information comprising the following steps:
   (a) providing a pulsed light beam;
   (b) modulating the intensity of said light beam to produce a sequence of light pulses embodying information to be recorded in the pattern of said light pulse sequence;
   (c) providing a light-sensitive recording medium, and
   (d) exposing said recording medium to said sequence of light pulses deflected to intersect said recording medium along a pattern of sweep lines arranged generally mutually laterally displaced along a scan direction generally transverse to said sweep lines.

53. A method as defined in claim 52 further comprising the additional steps of:
   (a) providing said information to be recorded in the form of information signals operating means for so modulating the intensity of said light pulse sequence; and
   (b) providing control signals for operating deflection means for so deflecting said sequence of light pulses.

54. A method as defined in claim 52 further comprising the additional steps of carrying out steps (a) through (d) of claim 52 for additional information to be recorded, having advanced said recording medium to expose said recording medium to a subsequent sequence of light pulses along a pattern of sweep lines at a location at least partly displaced from that of previous sweep lines.

55. A method of recording information comprising the following steps:
   (a) deflecting a pulsed light beam to scan a light-sensitive recording medium along a scan direction while sweeping out a raster structure of dots along sweep lines on said medium generally lateral to said scan direction; and
   (b) modulating said pulsed light beam to embody information to be recorded such that said information is imparted to said recording medium generally in a two-dimensional array of said dots produced by exposure of said recording medium to said modulated pulsed light beam.

56. A method as defined in claim 55 further comprising the additional steps of:
   (a) providing imaging information according to a plotting mode, and embodying all possible dot combinations for such sweep lines according to said plotting mode;
   (b) constructing information signals by combining data signals, embodying data input, with such imaging information corresponding to values of said data signals; and
   (c) so modulating said pulsed light beam in accordance with said information signals.

57. A method as defined in claim 55 wherein said array of dots is produced in a wiggle mode.

58. A method as defined in claim 55 wherein said array of dots is produced in a variable area mode.

59. A method as defined in claim 55 wherein said array of dots is produced in a variable density mode.

60. A method as defined in claim 55 further comprising the additional steps of carrying out steps (a) and (b) of claim 55 for additional information to be recorded, having advanced said recording medium to center the raster structure for subsequent information to be recorded displaced from the center position of the raster structure of previous information so recorded.

* * * * *